United States Patent [19]
Yamada et al.

[11] Patent Number: 4,851,096
[45] Date of Patent: Jul. 25, 1989

[54] METHOD FOR FABRICATING A MAGNETO-OPTICAL RECORDING ELEMENT

[75] Inventors: Takashi Yamada, Hayato; Hisao Arimune; Takashi Maeda, both of Kokubu, all of Japan

[73] Assignee: Kyocera Corporation, Kyoto, Japan

[21] Appl. No.: 42,273

[22] Filed: Apr. 24, 1987

Related U.S. Application Data

[62] Division of Ser. No. 752,927, Jul. 8, 1985, Pat. No. 4,680,742.

[30] Foreign Application Priority Data

Jul. 7, 1984 [JP] Japan ................ 59-143079
May 31, 1985 [JP] Japan ................ 60-119342

[51] Int. Cl.$^4$ .................................. C23C 14/14
[52] U.S. Cl. ..................... 204/192.23; 204/192.15
[58] Field of Search ........... 204/192.15, 192.2, 192.22, 204/192.23, 298 TC; 437/241

[56] References Cited

U.S. PATENT DOCUMENTS

| | | | |
|---|---|---|---|
| 3,622,410 | 11/1971 | Carlson | 204/192.22 |
| 3,819,990 | 6/1974 | Hagashi et al. | 204/192.22 |
| 4,002,542 | 1/1977 | Young | 204/192.22 |
| 4,331,526 | 5/1982 | Kuehule | 204/192.22 |
| 4,333,808 | 6/1982 | Bhattacharyya et al. | 204/192.22 |
| 4,380,557 | 4/1983 | Ishioka et al. | 204/192.26 |
| 4,510,190 | 4/1985 | Glaser | 204/192.22 |
| 4,544,443 | 10/1985 | Ohata et al. | 204/192.37 |
| 4,680,742 | 7/1987 | Yamada et al. | 156/643 |
| 4,683,044 | 7/1987 | Shimizu et al. | 204/192.22 |

FOREIGN PATENT DOCUMENTS 0012407 4/1972 Japan.

Primary Examiner—John F. Niebling
Assistant Examiner—Steven P. Marquis
Attorney, Agent, or Firm—Spensley Horn Jubas & Lubitz

[57] ABSTRACT

In a magneto-optical recording element comprising a substrate, a magentic layer and a dielectric layer, the dielectric layer is formed by deposition of a composition comprising $Si_3H_4$ and a refractive index-improving agent such as $Al_2O_3$ or $Y_2O_3$. This dielectric layer has a high refractive index and the enhancement effect is improved. Moreover, this dielectric layer is excellent in the adhesion and resistance characteristics.

17 Claims, 6 Drawing Sheets

METHOD FOR FABRICATING A MAGNETO-OPTICAL RECORDING ELEMENT

This is a division of application Serial No. 06/752,927, filed on July 8, 1985 now U.S. Pat. No. 4,680,742.

BACKGROUND OF THE INVENTION

1. Field of the Invention

The present invention relates to a magneto-optical recording element, especially an erasable magneto-optical recording element, in which the figure of merit is improved and the adhesion to a substrate and various resistance characteristics are improved in a magneto-optical recording medium. Furthermore, the present invention relates to a method for the fabrication of this magneto-optical recording medium.

2. Description of the Prior Art

Recently, research has been vigorously made on high-density recording using a magneto-optical recording medium. According to this recording method, laser beams are projected on a recording medium to locally heat the recording medium and write bits into the recording medium, and the recorded information is read out by utilizing the magneto-optical effect. According to this method, large quantities of informations are recorded at a high density. This magneto-optical recording medium is obtained by forming an amorphous metal vertical magnetization film composed of a rare earth element and a transmission metal mainly by sputtering.

In this magneto-optical recording system, improvement of the recording medium per se and formation of a dielectric layer between the substrate and recording medium have been proposed as means for improving the magneto-optical characteristics.

More specifically, in a photomagnetic recording element comprising a transparent substrate, a transparent dielectric layer and a magnetic layer of a magneto-optical recording medium formed on the transparent substrate through the transparent dielectric layer, if the thickness t of the dielectric layer is set so that multiple reflection is caused when laser beams are projected from the substrate side for reproduction, that is, the thickness t of the dielectric layer is set so that the following condition is satisfied:

$$t = \lambda/4n \cdot (2m+1)$$

wherein $\lambda$ stands for the reproduction wavelength of laser beams, n stands for the refractive index of the dielectric layer, and m is a number of 0, 1, 2, 3, ...., an enhancement of a Polar Kerr effect can be obtained and figures of merit can be prominently improved.

As the dielectric material, there can be mentioned oxides such as $CeO_2$, $ZrO_2$, $TiO_2$, $Bi_2O_3$ and SiO and non-oxides such as $Si_3N_4$, AlN, CdS, SiC and ZnS. Non-oxides are advantageous in that oxygen originating from the dielectric material is not present in the interface of the amorphous metal vertical magnetization film and deterioration of the magnetic layer owing to diffusion of oxygen is obviated, and if a non-oxide dielectric material excellent in the impermeability of water and oxygen in air is selected and used, a dielectric layer which is stable for a long time and has a high reliability can be obtained.

A plastic material has been used for a substrate of an optical disc for high-density recording because the plastic material is light in the weight, cheap in the cost and excellent in the durability and safety and a large quantity of substrates provided with guide tracks can be reproduced by injection molding. Thus, substrates for magneto-optical recording have been prepared by using polymeric material having an excellent light transmittance, such as a polycarbonate resin and a polymethyl methacrylate resin.

Under this background, it is considered that in a magneto-optical recording element comprising a magnetic layer formed on a substrate of this plastic material through a non-oxide type dielectric layer, if reproduction is performed by projecting laser beams from the substrate side, the higher the refractive index of the dielectric layer than that of the substrate, the larger is the enhancement effect.

As the non-oxide type dielectric material having a high refractive index, there can be mentioned ZnS (n=2.35), CdS (n=2.6) and SiC (n>3). However, these dielectric materials are relatively poor in resistance characteristics and if a layer of such a dielectric material is placed in a high-temperature high-humidity environment for a long time, oxygen and water in air are supplied into the magnetic layer through many pinholes formed at the step of preparing this dielectric layer and deterioration phenomena such as oxidation are caused in the magnetic layer. Although $Si_3N_4$ has a refractive index of from 1.9 to 2.1, it provides a dense film free of pinholes, which is excellent in various resistance characteristics. Accordingly, it is desired that the refractive index of the $Si_3N_4$ dielectric layer will be improved while excellent resistance characteristics are effectively utilized. However, no proposal has been made in the art to realize this desire.

SUMMARY OF THE INVENTION

Under this background we made research on the $Si_3N_4$ dielectric material, and as the result, it was found that if a predetermined amount of a specific additive is incorporated in $Si_3N_4$, all of the above-mentioned problems can be solved. We have now completed the present invention based on this finding.

It is therefore a primary object of the present invention to provide a magneto-optical recording element comprising a dielectric layer of $Si_3N_4$ excellent in the oxidation resistance, the long-time stability and various resistance characteristics such as the resistance to exposure to a high-temperature high-humidity environment, in which the refractive index of the $Si_3N_4$ dielectric layer is increased and the figures of merit are improved.

Another object of the present invention is to provide a method in which formation of a dielectric layer of $Si_3N_4$ is accomplished with a good productivity by sputtering and a dielectric layer excellent in various characteristics is obtained.

More specifically, in accordance with one fundamental aspect of the present invention, there is provided a magneto-optical recording element comprising a substrate, a dielectric layer containing silicon nitride and a magnetic layer for magneto-optical recording having an axis of easy magnetization perpendicular to the film surface thereof, wherein the dielectric layer consists of a deposition film formed of a composition comprising silicon nitride and an agent for improving the refractive index of silicon nitride and the dielectric layer has a refractive index of at least 2.15.

In accordance with another fundamental aspect of the present invention, there is provided a method for the fabrication of a magneto-optical recording element, which comprises maintaining a substrate on which a film is to be formed, a first target composed of a magnetic layer-forming metal and a second target composed of a composition comprising (a) silicon nitride and (b) at least one additive selected from single elements, oxides, nitrides, sulfides and silicides of elements of the groups IIIa, IVa, VIa, IIb, IIIb, IVb and VIb of the Periodic Table in an inert gas atmosphere maintained at $1 \times 10^3$ to $50 \times 10^3$ Torr and forming a magnetic layer and a dielectric layer alternately on the substrate by sputtering.

DETAILED DESCRIPTION OF THE PREFERRED EMBODIMENTS

In the invention, the shape of the substrate on which the magnetic layer is to be formed is not particularly critical. However, the description will now be made with reference to a substrate for a recording disc hereinafter.

Figure 1:
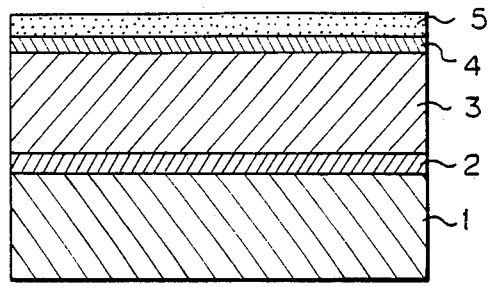
FIG. 1 is a sectional view illustrating the layer structure of a typical embodiment of the magneto-optical recoding element according to the present invention.

FIG. 1 is a sectional view showing a typical layer structure of the magneto-optical recording element according to the present invention. Referring to FIG. 1, a magnetic layer 3 is laminated on a substrate 1 for a recording disc through a first $Si_3N_4$ dielectric layer 2, and a second $Si_3N_4$ layer 4 is formed on the magnetic layer 3 and a protecting layer 5 is formed on the dielectric layer 4.

For formation of the $Si_3N_4$ dielectric layer on the surface of the substrate 1 for a recording disc, PVD (physical vacuum deposition) or CVD (chemical vacuum deposition) is preferably adopted so as to comply with mass production because the magnetic layer 3 is formed by the film-forming technique such as sputtering. For example, as means for forming the $Si_3N_4$ dielectric layer 4 by sputtering, there may be adopted a method conducted by using an additive-containing $Si_3N_4$ sintered body described hereinafter as the target, a method conducted by a composite target comprising an $Si_3N_4$ target and a target of an additive or a reactive sputtering method conducted in a nitrogen atmosphere by using an alloy target in which an Si additive is incorporated.

In the present invention, a glass or a plastic material such as a polycarbonate resin (hereinafter referred to as "PC resin") or a polymethyl methacrylate resin (hereinafter referred to as "PMMA resin") may be used as the material of the substrate 1. It is preferred that the surface portion to which the $Si_3N_4$ dielectric layer 2 is bonded be formed of a plastic material. For example, a substrate 1 composed entirely of a plastic material is advantageous in that the weight is light, the cost is cheap and the durability and safety are good and that large quantities of substrates provided with guide tracks can be reproduced by injection molding. Moreover, the figures of merit can be improved by interposition of the $Si_3N_4$ dielectric layer 2.

It is important that the additive for improving the refractive index of $Si_3N_4$ per se, that is, the refractive index improver, should be incorporated in the $Si_3N_4$ dielectric layer of the present invention so that the refractive index is at least 2.15.

As the additive, there can be mentioned single elements, oxides, nitrides, sulfides and silicides of elements of the gdoup IIIa of the Periodic Table such as Y, La and Ce, elements of the group IVa of the Periodic Table such as Ti and Zr, elements of the group VIa of the Periodic Table such as Cr and Mo, elements of the group Vb of the Periodic Table such as Sb and Bi, elements of the group IVb of the Periodic Table such as Si, Ge, Sn and Pb, elements of the group IIIb of the Periodic Table such as Al and elements of the group IIb of the Periodic Table such as Zn and Cd. For example, there can be mentioned single elements such as Al, Ti, Si and Ge and compounds such as $Al_2O_3$, $Y_2O_3$, $La_2O_3$, $CeO_2$, $Bi_2O_3$, $GeO_2$, $ZrO_2$, $CdO$, $Cr_2O_3$, $SnO_2$, $PbO$, $AlN$, $TiN$, $YN$, $ZnS$, $Sb_2S_3$, $TiSi_2$ and $YSi_2$. These additives may be used singly or in the form of a mixture of two or more of them.

Some of the refractive index improvers to be incorporated in the $Si_3N_4$ dielectric layer in the present invention have hertofore been used as sintering aids for $Si_3N_4$. However, in the present invention, $Si_3N_4$ is contained in the dielectric layer in the state quite different from the sintered state. Namely, $Si_3N_4$ is contained in the amorphous state in the dielectric layer of the present invention. Accordingly, it is quite surprising that by incorporation of an additive such as mentioned above, the refractive index of the dielectric layer is improved.

Of course, the present invention includes an embodiment in which prominent additional advantages described hereinafter are attained by using a sintered body of $Si_3N_4$ as the target for formation of a dielectric layer by sputtering.

It sometimes happens that the composition of the target for formation of the dielectric layer is different from the composition of the actually formed dielectric layer. Generally, the $Si_3N_4$ content in the dielectric layer tends to be higher than the $Si_3N_4$ content in the target. However, if the above-mentioned additive is contained in the dielectric layer in an amount of at least 0.1 mole %, especially 0.5 to 8.0 mole %, the refractive index is satisfactorily improved. It is preferred that the additive be contained in the target in an amount of 4 to 20 mole %.

As the dielectric layer suitable for attaining the objects of the present invention, there can be mentioned a deposition film formed of a composition comprising 0.1 to 5.0 mole % of alumina or aluminum nitride and 0.1 to 3.0 mole % of an oxide or nitride of a rare earth element with the balance being silicon nitride.

As examples of the dielectric layer-forming target composed of a composition comprising $Si_3N_4$ and a sintering aid, which is preferably used in the present invention, there can be mentioned $Si_3N_4$(90 mole %)-$Al_2O_3$(6 mole %)-$Y_2O_3$(4 mole %), $Si_3N_4$(90 mole %)-$Al_2O_3$(6 mole %)-$La_2O_3$(4 mole %), $Si_3N_4$(90 mole %)-$Al_2O_3$(6 mole %)-$CeO_2$(4 mole %) and $Si_3N_4$(90 mole %)-AlN(5 mole %)-$La_2O_3$(5 mole %). The refractive index can be increased with increase of the proportion of the Si atom in $Si_3N_4$, and we have found that if a target for forming of a dielectric layer, which is formed by adding 5 to 20 mole % of Si to $Si_3N_4$, is used, the refractive index can be prominently increased.

The $Si_3N_4$ dielectric layer of the present invention contains the above-mentioned additive as the indispensable component, but it may further contain other component so far as the effect of the additive is not lost. For example, the dielectric layer may contain a minor amount of $SiO_2$ or WC.

From the results of experiments conducted repeatedly by us, it has been confirmed that if the content of the additive in the target is at least 4 mole %, prominent effects can be attained. It is preferred that the maximum refractive index of the $Si_3N_4$ dielectric layer be determined within such a range that the reflectance is not greatly reduced and a sufficient quantity of light can be assured for focussing at the time of rotation of the disc, though this maximum refractive index differs according to the optical constant of the magnetic layer and the material of the substrate. When a PC resin, a PMMA resin or a glass is used as the substrate, since the refractive index is 1.59, 1.5 or 1.5, respectively, it is practically preferred that the refractive index of the $Si_3N_4$ dielectric layer be increased within a range not exceeding 3.5.

If the refractive index of the $Si_3N_4$ dielectric layer is increased, the enhancement effect is improved and simultaneously, the thickness t of the dielectric layer can be reduced based on the formula of $t=\lambda/4n \cdot (2m+1)$ for obtaining the enhancement effect, with the result that the film-forming time required for formation of the dielectric layer can be shortened by scores of % and the deviation of the enhancement effect owing to the unevenness of the layer thickness distribution on the substrate can be reduced.

Moreover, according to the present invention, if $Si_3N_4$ is contained as the main component in the target for formation of the $Si_3N_4$ dielectric layer in an amount of at least 60 mole %, preferably at least 80 mole %, a film free of pinholes can be formed, though this lower limit of the $Si_3N_4$ content differs to some extent according to the kind of the additive. Therefore, deterioration such as oxidation is not caused in the dielectric layer even if it is exposed to a high-temperature high-humidity environment for a long time, and inherent excellent resistance characteristics of $Si_3N_4$ can be retained.

Furthermore, in the $Si_3N_4$ dielectric layer of the present invention, the linear expansion coefficient can be increased to $4 \times 10^{-6}$ to $10 \times 10^{-6}/°$ C., and this can be brought close to those of the glass substrate, the PC resin and the PMMA resin that are $9 \times 10^6$ to $10 \times 10^{-6}/°$ C., $6.6 \times 10^{-5}/°$ C and $5 \times 10^{-5}$ to $9 \times 10^{-5}/°$ C., respectively. Therefore, occurrence of peeling of the magnetic layer or cracking is hardly caused and the adhesion to each substrate is improved, with the result that a high reliability is ensured for a long time and inherent excellent magneto-optical characteristics can be maintained. Incidentally, the linear expansion coefficient of $Si_3N_4$ per se is $1.9 \times 10^{-6}/°$ C.

In the magneto-optical recording element of the present invention, a magnetic layer 3 composed of an amorphous metal easy magnetization film such as TbFe, GdCo, TbFeCo, DyFeCo, GdTbFeCo or GdDyFeCo is formed on the glass or plastic substrate 1 through the above-mentioned $Si_3N_4$ dielectric layer 2, and in order to prevent oxidation or other deterioration of the magnetic layer 3, a second $Si_3N_4$ dielectric protecting layer 4 is preferably formed on the magnetic layer. It is preferred that also this protecting layer be the above-mentioned $Si_3N_4$ dielectric layer of the present invention, and in this case, one target can be commonly used.

In the magneto-optical recording element of the present invention, a certain interposing layer may be formed between the substrate 1 and the $Si_3N_4$ dielectric layer 2 or between this dielectric layer 2 and the magnetic layer 3 so as to effectively improve the magneto-optical characteristics.

In the magneto-optical recording element of the present invention, a protecting resin layer 5 may be formed on the second dielectric layer 4. A known ultraviolet ray-curable acrylic resin, polyester resin or acrylic urethane resin may be used for the protecting resin layer 5.

Figure 2:
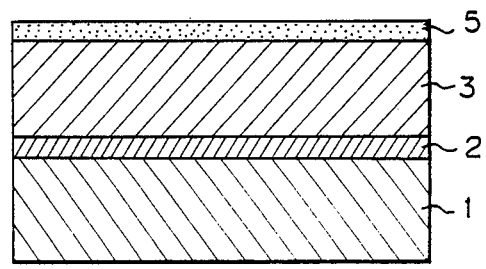
FIG. 2 is a sectional view illustrating a magneto-optical recording element having a different layer structure.

As shown in FIG. 2, the protecting layer 5 of an ultraviolet ray-curable resin may be formed directly on the surface of the magnetic layer 3 while omitting the second dielectric layer 4.

Figure 3:
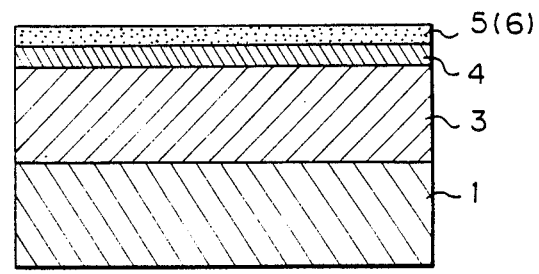
FIG. 3 is a sectional view illustrating a magneto-optical recording element having a still different layer structure.

Furthermore, as shown in FIG. 3, there may be adopted a layer structure comprising a magnetic layer 3 formed on a substrate 1, a dielectric layer 4 of the present invention formed on the magnetic layer 3 and a protecting resin layer 5 formed on the dielectric layer 4. In this case, an enhancement effect can be obtained by applying reproducing laser beams from the side opposite to the substrate 1. Moreover, there may be adopted an embodiment in which a metal vacuum deposition layer 6 is formed instead of the protecting resin layer 5 and an enhancement effect is obtained by applying reproducing laser beams from the side of the substrate 1.

The method for the fabrication of the magneto-optical recording element of the present invention will now be described.

Sputtering, vacuum deposition or ion plating may be adopted for the fabrication of the magneto-optical recording element of the present invention. The fabrication method using a magnetron sputtering apparatus shown in FIG. 7 will now be described in detail by way of an example.

Figure 7:
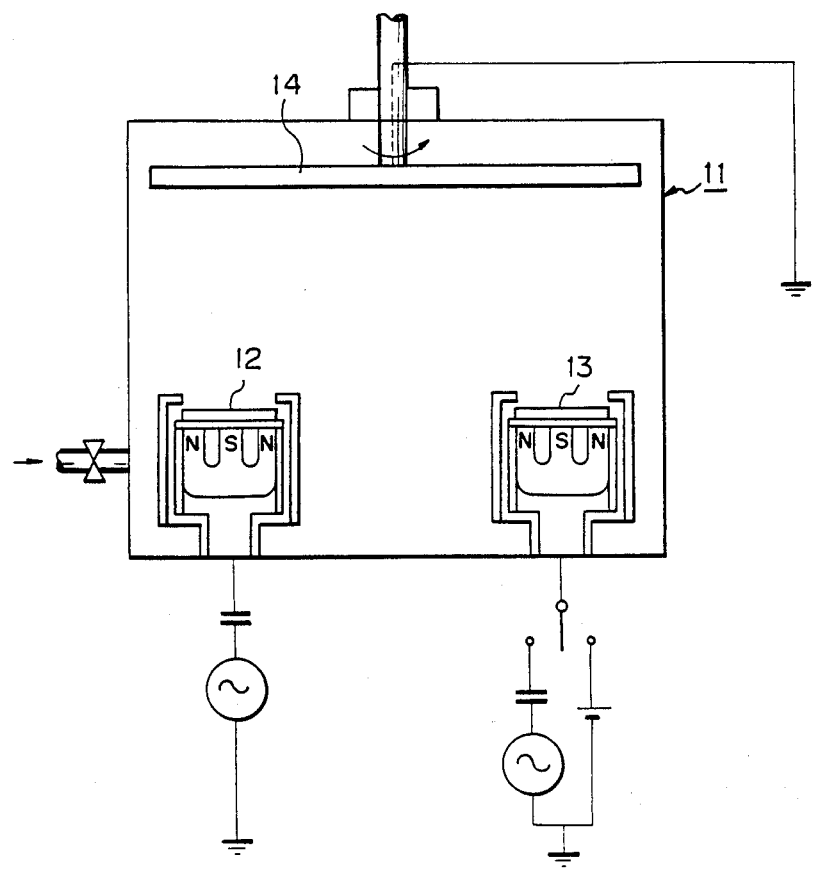
FIG. 7 is an arrangement diagram illustrating an apparatus preferably used for the fabrication of the magneto-optical recording element of the present invention.

Referring to FIG. 7, a first target 12 composed of a sintered body of $Si_3N_4$, a second target 13 composed of a magnetic alloy and a disc-shaped substrate 14 which is rotated and driven to form a combination of films thereon are arranged within a vacuum tank 11.

High-frequency sputtering is effected between the first target 12 and the substrate 14 and sputtering is effected by application of a high-frequency voltage or direct current voltage between the second target 13 and the substrate 14.

A planar magnetron type cathode is arranged below the first and second targets 12 and 13, whereby the efficiency of ionization of the discharge gas molecules is increased by utilizing the Penning discharge effect by crossed electric and magnetic fields and a high film-forming speed suitable for mass production can be attained.

According to the present invention, in the above-mentioned apparatus, formation of the $Si_3N_4$ dielectric layer and formation of the magnetic layer are carried out in an optional lamination order. At first, the apparatus is evacuated to a high vacuum degree less than $1 \times 10^{-5}$ Torr, and a sputtering inert gas such as argon or nitrogen is introduced so that a predetermined pressure is maintained. If the pressure of the atmosphere gas is lower than $1 \times 10^{-3}$ Torr, a stable discharge state cannot be obtained and formation of a film becomes difficult. If the pressure of the atmosphere gas exceeds $50 \times 10^{-3}$ Torr, the amount of argon (Ar) or oxygen (O) contained in the magnetic film is increased and attainment of the objects of the present invention becomes difficult, and no good uniformity or stability can be obtained. Therefore, the pressure of the atmosphere gas is set at $1 \times 10^{-3}$ to $50 \times 10^{-3}$ Torr, preferably $3 \times 10^{-3}$ to $20 \times 10^{-3}$ Torr.

In case of the recording element shown in FIG. 1, a high-frequency electric power is applied between the first target 12 and the substrate 14 to form an $Si_3N_4$ dielectric layer, and when a predetermined thickness is obtained, sputtering is stopped. Then, a high-frequency electric power is applied between the second target 13 and the substrate 14 to form a magnetic layer, and when a predetermined thickness is obtained, this sputtering is stopped. Then, sputtering for formation of an $Si_3N_4$ dielectric layer is carried out again.

According to the present invention, by using as the first target a composite $Si_3N_4$ sintered body in which an additive as described hereinbefore is incorporated, the refractive index of the dielectric layer is improved and additionally, the following advantages can be attained.

The vacuum degree in the sputtering apparatus for formation of a film before introduction of a non-oxidizing gas (such as Ar or $N_2$) may be at a level of $1 \times 10^{-5}$ Torr ($1.3 \times 10^{-3}$ Pa) or less. According to the conventional technique, the required vacuum degree is $1 \times 10^{-6}$ Torr or less. Namely, according to the present invention, the required vacuum degree can be moderated about 10 times. Therefore, the time required for evacuation can be shortened and the production efficiency can be increased. The reason why the vacuum degree attained before introduction of the non-oxidizing gas is thus controlled is that if the vacuum degree is larger than the critical value, the residual gas in the apparatus (such as water, oxygen or nitrogen) is included in the dielectric layer to form silicon oxynitride (Si-N-O), with the result that the refractive index is reduced and becomes close to that of $SiO_2$.

The conventional $Si_3N_4$ target is porous and the porosity is higher than about 30%. In contrast, in the present invention, since a sintering aid for silicon nitride is used as the additive, an $Si_3N_4$ target having a porosity lower than 5% can be formed and used, and the following disadvantages involved in the conventional technique can be eliminated.

Since the conventional target has pores therein, the discharge stability at the sputtering step is poor. Moreover, the effect of cooling the target for controlling the temperature of the target is insufficient because of the presence of pores. Furthermore, it is considered that an impurity gas is contained in closed pores present in the interior of the conventional $Si_3N_4$ sintered body target, and a uniform and stable quality cannot be obtained because of this impurity gas.

The present invention will now be described in detail with reference to the following examples that by no means limit the scope of the invention.

EXAMPLE 1

Starting $Si_3N_4$ having a purity of 99.9% was mixed with $Al_2O_3$ and $Y_2O_3$, and the mixture was molded, sintered and processed into a disc-like shape having a diameter of 6 inches and a thickness of 5 mm. The so-obtained composite $Si_3N_4$ was set in a high-frequency binary magnetron sputtering apparatus. One of a glass substrate, a PC resin substrate and a PMMA resin substrate was arranged in the sputtering apparatus as the substrate 1, and the sputtering apparatus was evacuated to $5 \times 10^{-7}$ Torr. Then, Ar gas having a purity of 99.999% was introduced until the pressure was elevated to $5 \times 10^{-3}$ Torr. Then, an electric power of 50 W was applied to the substrate 1 to effect etching and pre-sputtering was conducted for 5 minutes on the substrate at a high-frequency power of 1 KW to form a composite $Si_3N_4$ dielectric layer 2. The film-forming conditions were set so that the thickness of the formed composite $Si_3N_4$ dielectric layer 2 was $\lambda/4n$ (in which $\lambda$ stands for the wavelength of reproducing laser beams, which was adjusted to 8000 Å in this example, and n stands for the refractive index of the composite $Si_3N_4$ dielectric layer). Then, pre-sputtering was carried out for 60 minutes at a high-frequency power of 200 W to form a DyFeCo layer having a thickness of about 1500 Å in each element.

A composite $Si_3N_4$ protecting layer 4 was formed on the so-obtained magnetic layer 3 under the same conditions as adopted for formation of the above-mentioned composite $Si_3N_4$ dielectric layer 2.

Incidentally, from the results of the fluorimetric X-ray analysis, it was found that the target used for formation of the composite $Si_3N_4$ dielectric layer 2 and composite $Si_3N_4$ protecting layer 4 comprised 90 mole % of $Si_3N_4$, 6 mole % of $Al_2O_3$ and 4 mole % of $Y_2O_3$.

With respect to the so-obtained magneto-optical recording elements of the present invention, the figure of merit, the resistance characteristics and the adhesion were determined according to the following methods.

(1) Figure of Merit

With respect to the magneto-optical recording element formed by using the glass substrate (having a refractive index of 1.5), reproducing laser beams (having a wavelength of 8000 Å) were projected from the substrate side and the Kerr rotation angle $\theta k$ and reflectance $\underline{R}$ were measured, and the figure of merit $\eta(=\sqrt{R} \times \theta k)$ was determined. The obtained results are shown in Table 1.

For comparison, data of the comparative photomagnetic recording element, which was prepared in the same manner as described above except that $Si_3N_4$ dielectric and protecting layers were formed without incorporation of any additive, are shown in Table 1.

In order to express the enhancement effect by a numerical value, a magneto-optical recording element having the same composite dielectric layer 2 and magnetic layer 3 as described above but being not provided with the composite $Si_3N_4$ protecting layer 4 as shown in FIG. 2 was prepared, reproducing laser beams (having a wavelength of 8000 Å) were projected to the element from the magnetic layer side and the inherent figure of merit $\eta'$ of the magnetic layer was determined. Similarly, the enhancement effect of the comparative element was determined.

TABLE 1

|  | Present Invention | Comparison $Si_3N_4$ (99.9%) |
|---|---|---|
| Laser Beams Applied from the Substrate Side |  |  |
| $\theta k$ (°) | 0.731 | 0.600 |
| R (%) | 16.5 | 19.5 |
| $\sqrt{R} \cdot \theta k$ (°) (= $\eta$) | 0.297 | 0.265 |
| Laser Beams Applied from the Magnetic Layer Side |  |  |
| $\sqrt{R} \cdot \theta k$ (°) (= $\eta'$) | 0.190 | 0.192 |
| Enhancement Effect, 20 log $\eta/\eta'$ (dB) | 3.9 | 2.8 |
| Refractive Index of Dielectric Layer | 2.32 | 2.15 |
| Thickness (Å) of Dielectric Layer | 862 | 930 |

From the data shown in table 1, it is seen that in the element of the present invention, the refractive index of the dielectric layer is increased and the enhancement becomes higher than in the comparative element and the figure of merit is larger by about 12%.

(2) Resistance Characteristics

Figure 4:
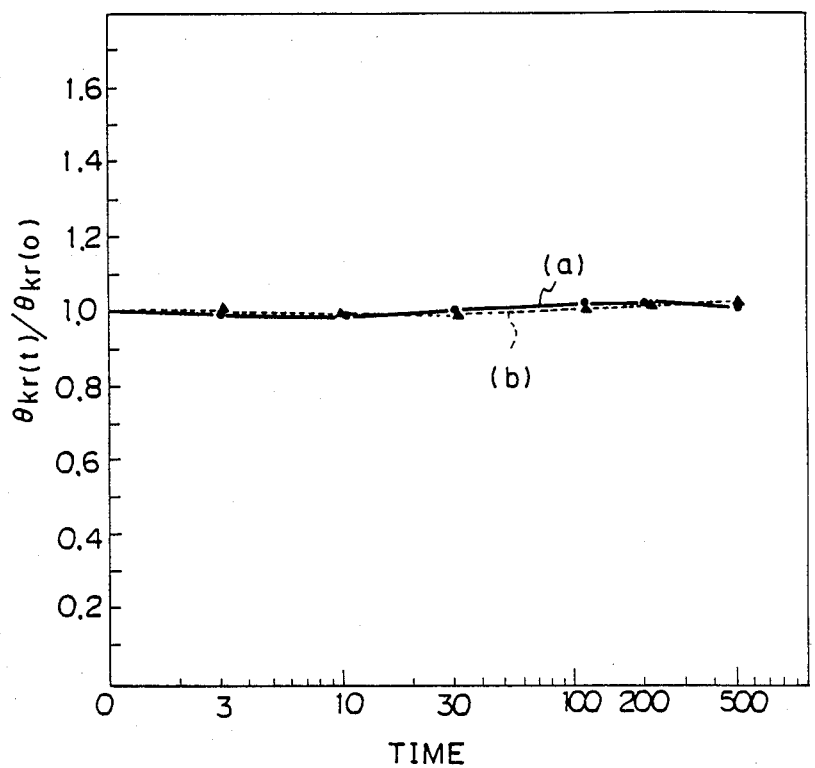
FIG. 4 is a graph showing the time dependency of the ratio of the Kerr rotation angle $\theta kr(t)$ to the Kerr rotation angle $\theta kr(o)$.
Figure 5:
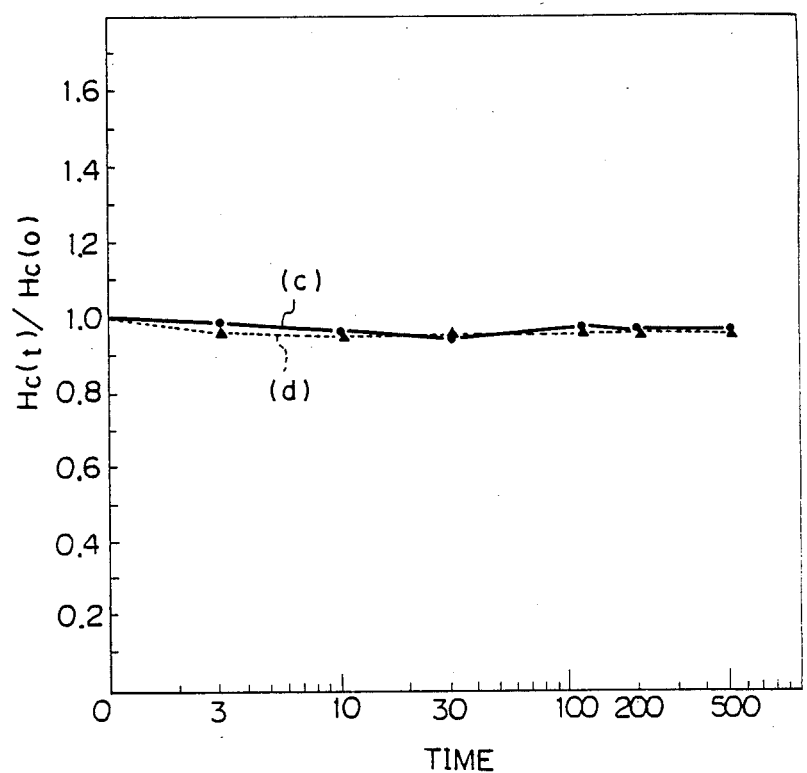
FIG. 5 is a graph showing the time dependency of the ratio of the coercive force $Hc(t)$ to the coercive force $Hc(o)$.
Figure 6:
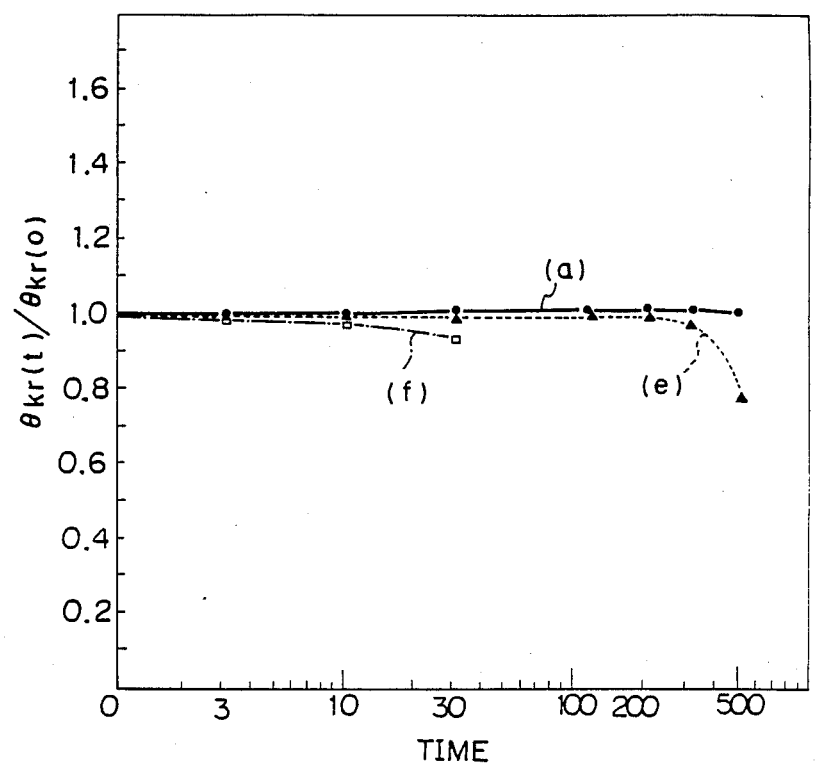
FIG. 6 is a graph showing the time dependency of the ratio of $\theta kr(t)$ to $\theta kr(o)$ in the magneto-optical recording element of the present invention and photoelectric recording elements comprising a dielectric layer of SiC or CdS.

With respect to the magneto-optical recording element formed by using the glass laminate, changes of the Kerr rotation angle and coersive force were traced from the point just after the fabrication of the element placed in a high-temperature high-humidity atmosphere maintained at a temperature of 65° C. and a relative humidity of 90 to 95%. The obtained results are shown in FIGS. 4 and 5. Incidentally, the data obtained with respect to comparative elements comprising an SiC or CdS dielectric layer are shown in FIG. 6. Incidentally, these data were obtained from the Kerr hysteresis loops by using a Kerr effect-measuring apparatus (supplied by Nippon Bunko K.K.). The wavelength of reproducing laser beams used for the measurement was 6328 Å.

In FIG. 4, the ratio of the Kerr rotation angle $\theta kr(t)$ after the lapse of time t to the Kerr rotation angle $\theta kr(o)$ just after the fabrication is plotted. Incidentally, $\theta kr$ indicates the residual Kerr rotation angle. Marks ● indicate the values obtained with respect to the element of the present invention and curve (a) is a time dependency curve obtained by connecting these values. Marks ▲ indicate the values obtained with respect to the comparative element prepared in the same manner as described above except that no additive was incorporated in the $Si_3N_4$ dielectric layer and $Si_3N_4$ protecting layer, and curve (b) is a time dependency curve obtained by connecting these values.

From FIG. 4, it is seen that even after the lapse of 500 hours, the characteristic of the element of the present invention is hardly changed as compared with the characteristic of the comparative element and the composite $Si_3N_4$ dielectric layer of the present invention is comparable or superior to the known $Si_3N_4$ protecting layer as the layer for protecting a magneto-optical recording magnetic film.

In FIG. 5, the ratio of the coercive force Hc(t) after the lapse of time t to the coercive force Hc(o) just after the fabrication is plotted. Marks ● indicates the values obtained with respect to the element of the present invention and curve (c) is a time dependency curve obtained by connecting these values. Marks ▲ indicate the values obtained with respect to the above-mentioned comparative element and curve (d) is a time dependency curve obtained by connecting these values.

From FIG. 5, it is seen that the element of the present invention retains an excellent characteristic even after the lapse of 500 hours as in the case of the known $Si_3N_4$ layer.

In FIG. 6, the change of the ratio $\theta kr(t)/\theta kr(o)$ with the lapse of time t is plotted. Curve (a) shown in FIG. 4 is similarly shown in FIG. 6, and the data obtained with comparative elements formed by using an SiC dielectric material or CdS dielectric material are shown in FIG. 6. Namely, marks ● indicate the values obtained with respect to the element of the present invention, marks ▲ indicate the values obtained with respect to the comparative element obtained by laminating the SiC dielectric layer, the DyFeCo layer and the SiC dielectric protecting layer in this order on the glass substrate and marks □ indicate the values obtained with respect to the comparative element obtained by laminating the CdS dielectric layer, the DyFeCo layer and the CdS dielectric protecting layer in this order on the glass substrate, and curves (a), (e) and (f) are time dependency curves obtained by connecting these values ●, ▲ and □, respectively. Incidentally, the DyFeCo layer was formed in the same manner as described above.

Incidentally, each of SiC and CdS shown in FIG. 6 is a medium having a refractive index larger than 2. As is seen from FIG. 6, in the comparative element formed by using the SiC dielectric material, the Kerr rotation angle was reduced after the lapse of 200 hours and the element could not be practically used. In the comparative element, the Kerr rotation angle was degraded after the lapse of about 10 hours and the degradation degree was extremely high. Thus, it was confirmed that a non-oxide type dielectric material having a refractive index larger than 2 is not suitable as an oxidation-resistant protecting layer.

(3) Adhesion Test

With respect of the magneto-optical recording elements obtained in this example, an adhesive tape (transparent tape) was sufficiently bonded to the surface of the composite $Si_3N_4$ protecting layer and the tape was then pulled and peeled, and this operation was conducted 5 times on the same area. This bonding-peeling test was conducted on other areas of the protecting layer. Thus, the adhesion between the substrate and the dielectric layer was evaluated.

The results of this adhesion test are shown in Table 2.

TABLE 2

|  | Present Invention | Comparison |
|---|---|---|
| Composition of Target for $Si_3N_4$ Dielectric Layer | $Si_3N_4$(90 mole %)-$Al_2O_3$ (6 mole %)-$Y_2O_3$(4 mole %) | $Si_3N_4$(99.9 mole %) |
| Film-Forming Speed (Å/sec) of $Si_3N_4$ |  |  |

TABLE 2-continued

| | Present Invention | Comparison |
|---|---|---|
| Dielectric Layer | | |
| 1-KW power for formation of film | 2.32 | 2.11 |
| 2-KW power for formation of film | 4.29 | 3.68 |
| Substrate Temperature (°C.) | | |
| 1-KW power for formation of film | 35 | 40 |
| 2-KW power for formation of film | 43 | 46 |
| Adhesion to Substrate | | |
| PC resin | ○ | Δ |
| PMMA resin | ○ | Δ |
| glass | ○ | ○ |

Note
○: excellent adhesion with no peeling of the dielectric layer
Δ: fair adhesion with peeling of the dielectric layer during repetition of the bonding-peeling test From the results shown in Table 2, it is seen that in the element of the present invention, the dielectric layer has a good adhesion to all of the substrates, but when the comparative $Si_3N_4$ (99.9 mole %) dielectric layer-forming target is used, the adhesion to plastic substrates is relatively poor and peeling of the dielectric layer is caused when the operation of bonding the transparent tape and peeling it is repeated.

It also is seen that according to the present invention, the film-forming speed is higher than in the comparison at the same applied electric power irrespectively of the material of the substrate and the substrate temperature can be lowered at the film-forming step in the present invention. The fact that the substrate temperature can be reduced at the film-forming step is especially important when a plastic substrate having a low heat distortion temperature is used, and this can be attained by preventing the secondary incidence of electrons on the substrate and reducing the heat radiation to the target. In the above example, a high electric power efficiency (film-forming speed/applied electric power) is attained and this high electric power efficiency is effective for carrying out the film-forming operation at a lower temperature. Namely, according to the present invention, there is provided an $Si_3N_4$ dielectric layer which can be formed at a high speed at such as low substrate temperature as not giving any thermal influence to a plastic substrate. Incidentally, in the sample, the substrate temperatures were compared while the thickness was maintained at a level providing an enhancement effect.

EXAMPLE 2

The procedures of Example 1 were repeated in the same manner except that composite $Si_3N_4$ dielectric layer-forming targets shown in Table 3 were used. With respect to each of the obtained dielectric layers, the refractive index and enhancement effect $\eta/\eta'$ were determined. The obtained results are shown in Table 3.

TABLE 3

| Composition of Dielectric Layer-Forming Target | Refractive Index of Dielectric Layer | Enhancement Effect, 20 log $\eta/\eta'$ (dB) | Thickness (Å) of Dielectric Layer |
|---|---|---|---|
| $Si_3N_4$(95 mole %)-Si(5 mole %) | 2.45 | 5.5 | 820 |
| $Si_3N_4$(80 mole %)-Si(20 mole %) | 2.61 | 5.7 | 770 |
| $Si_3N_4$(90 mole %)-$Al_2O_3$(6 mole %)-$La_2O_3$(4 mole %) | 2.41 | 5.4 | 830 |
| $Si_3N_4$(90 mole %)-AlN(10 mole %) | 2.26 | 5.1 | 885 |

From the results shown in Table 3, it is seen that in each element, the refractive index and enhancement effect were improved. When these elements were subjected to the resistance and adhesion tests in the same manner as described in Example 1, it was found that excellent results similar to those obtained in Example 1 were obtained. Moreover, with respect to each element, it was confirmed that the dielectric layer could be formed at a high film-forming speed at a low temperature.

In the same manner as described in Example 1, magneto-optical recording elements were prepared by using $Si_3N_4$ (90 mole %)-$Al_2O_3$(6 mole %)-$Y_2O_3$(4 mole %), $Si_3N_4$(90 mole %)-$Al_2O_3$(6 mole %)-$CeO_2$(4 mole %) and $Si_3N_4$(90 mole %)-AlN(5 mole %)-$La_2O_3$(5 mole %) as the dielectric layer-forming target. It was confirmed target. It was confirmed that the objects of the present invention can be attained by using these targets.

EXAMPLE 3

Magneto-optical recording elements were prepared in the same manner as described in Example 1 except that sintered bodies having a composition shown below were used as the target for forming a dielectric layer.
Run 1:
1$Si_3N_4$(89 mole %)-$Al_2O_3$(9 mole %)-$Y_2O_3$(2 mole %)
Run 2:
$Si_3N_4$(93 mole %)-$Al_2O_3$(5 mole %)-$Y_2O_3$(2 mole %)
Run 3:
$Si_3N_4$(97 mole %)-$Al_2O_3$(2 mole %)-$Y_2O_3$(1 mole %)
The obtained results are shown in Table 4.

TABLE 4

| Run No. | Laser Beams Applied from the Substrate Side | | | Laser Beams Applied from the Magnetic Layer Side $\eta'\,(°) = \sqrt{R'} \cdot \theta k'$ | Enhancement Effect, $20 \log \eta/\eta'$ (dB) | Refractive Index of Dielectric Layer | Thickness (Å) of Dielectric Layer |
|---|---|---|---|---|---|---|---|
| | $\theta k\,(°)$ | R (%) | $\eta\,(°) = \sqrt{R} \cdot \theta k$ | | | | |
| 1 | 0.666 | 18.3 | 0.285 | 0.191 | 3.5 | 2.26 | 885 |
| 2 | 0.651 | 18.5 | 0.280 | 0.190 | 3.4 | 2.23 | 900 |
| 3 | 0.613 | 19.3 | 0.269 | 0.190 | 3.0 | 2.18 | 920 |

EXAMPLE 4

A magneto-optical recording element was prepared in the same manner as described in Example 1 except that the evacuation was carried out so that the vacuum degree attained before sputtering was $5 \times 10^{-6}$ Torr. The obtained recording element had characteristics similar to those of the recording element obtained in Example 1.

EXAMPLE 5

A target of composite silicon nitride comprising $Si_3N_4$, 8.7 mole % of $Al_2O_3$ and 2.1 mole % of $Y_2O_3$ and having a porosity of 2%, which had a diameter of 6 inches and a thickness of 5 mm, was set in a high-frequency magnetron sputtering apparatus, and sputtering was carried out at a supplied power of 1 KW to form a composite silicon nitride film on a glass substrate.

In order to examine the influences of the preparation conditions on the refractive index, the vacuum degree attained before the starting of sputtering was changed in the range of from $5 \times 10^{-7}$ Torr to $1.5 \times 10^{-5}$ Torr.

The discharge gas used at the sputtering step was Ar gas having a purity of 99.999% and the Ar gas pressure at the sputtering step was adjusted to $5 \times 10^{-3}$ Torr.

For comparison, the above procedures were repeated in the same manner except that a target of $Si_3N_4$ (having a purity of 99.9%) having a porosity of 28% was used.

Figure 8:
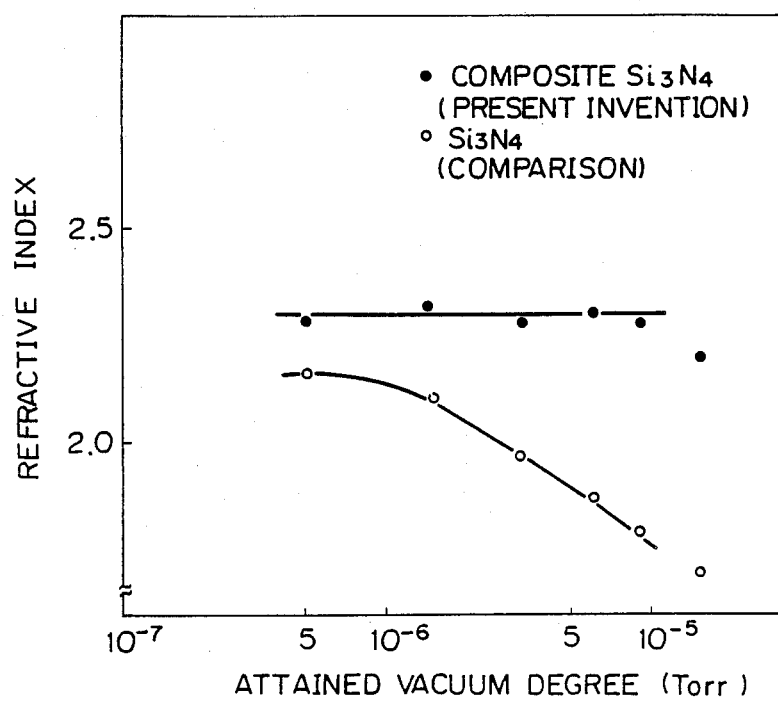
FIG. 8 is a graph illustrating the relation between the attained vacuum degree before initiation of sputtering and the refractive index of the formed film in composite $Si_3N_4$ used in the present invention and conventional $Si_3N_4$.

The obtained results are shown in FIG. 8.

From the results shown in FIG. 8, it is seen that according to the present invention, a film having a constant refractive index can be obtained if the attained vacuum degree is less than $1 \times 10^{-5}$ Torr.

From the results of the measurement using a quadrupole type mass analyzer, it was found that when the attained vacuum degree was low, the main component of the residual gas was water ($H_2O$).

As is apparent from the foregoing description, in accordance with the present invention, there is provided a magneto-optical recording element in which the refractive index of an $Si_3N_4$ dielectric material showing an excellent oxidation resistance to a magnetic layer can be increased while maintaining excellent resistance characteristics such as a high resistance to a high-temperature high-humidity environment, and therefore, the figure of merit is improved and the adhesion is increased.

We claim:

1. A method for the fabrication of a magneto-optical recording element, which comprises maintaining a substrate on which a film is to be formed, a first target composed of a sintered composition comprising (a) silicon nitride and (b) at least one additive selected from the group consisting of single elements, oxides, nitrides, sulfides and silicides of elements of the groups IIIa, IVa, VIa, IIb, IIIb, IVb and VIb of the Periodic Table and a second target composed of a magnetic layer-forming metal in an inert gas atmosphere maintained at $1 \times 10^{-3}$ to $50 \times 10^{-3}$ Torr and forming a magnetic layer and a dielectric layer alternately on the substrate by sputtering, wherein at least the substrate and first target are exposed to a vacuum of less than $1 \times 10^{-5}$ Torr, prior to maintaining said substrate, first target and second target in an inert gas atmosphere.

2. The method of claim 1 wherein the inert gas atmosphere is maintained at $3 \times 10^{-3}$ to $20 \times 10^{-3}$ Torr.

3. The method of claim 1 wherein the additive is present in the first target in an amount of 0.5 to 8.0 mole percent based on the second target.

4. The method of claim 1 wherein the sputtering is high-frequency sputtering.

5. The method of claim 1 wherein the first target comprises 0.1 to 5.0 mole % of alumina or aluminum nitride and 0.1 to 3.0 mole % of an oxide or nitride of a rare earth element.

6. The method of claim 1 wherein the substrate is composed of transparent plastic material.

7. The method of claim 1 wherien the magnetic layer is composed of an amorphous alloy magnetic material.

8. The method of claim 1 wherein the additive is at least one member selected from the group consisting of Al, Ti, Si, Ge, $Al_2O_3$, $Y_2O_3$, $La_2O_3$, $CeO_2$, $Bi_2O_3$, $GeO_2$, $ZrO_2$, CdO, $Cr_2O_3$, $SnO_2$, PbO, AlN, TiN, YN, ZnS, $Sb_2S_3$, $TiSi_2$, and $YSi_2$.

9. A method for fabrication of a magneto-optical recording element, the sequential steps of the method comprising:
 (a) providing a substrate on which a film is to be formed, a first target composed of a sintered composition comprising (i) silicon nitride and (ii) at least one additive selected from the group consisting of single elements, oxides, nitrides, sulfides, and silicides of elements of the groups IIIa, IVa, VIa, IIb, IIIb, IVb, and VIb of the Periodic Table and a second target composed of a magnetic layer-forming metal;
 (b) exposing at least said substrate and said first target to a vacuum of less than $1 \times 10^{-5}$ Torr;
 (c) maintaining the substrate, the first target and the second target in an inert gas atmosphere maintained at $1 \times 10^{-3}$ to $50 \times 10^{-3}$ Torr;
 (d) applying a high-frequency electric power or direct current between the first target and the substrate to form a first dielectric layer; and
 (e) applying a high-frequency or direct current electric power between the second target and the substrate to form a magnetic layer.

10. The method of claim 9, further comprising the step of (f) applying a high frequency or direct current electric power between the first target and the substrate to form a second dielectric layer.

11. The method of claim 9 wherein the inert gas atmosphere is maintained at $3 \times 10^{-3}$ to $20 \times 10^{-3}$ Torr.

12. The method of claim 9 wherein the additive is present in the first target in an amount of 0.5 to 8.0 mole percent based on the first target.

13. The method of claim 9 wherein the sputtering is high-frequency sputtering.

14. The method of claim 9 wherein the first target comprises 0.1 to 5.0 mole % of alumina or aluminum nitride and 0.1 to 3.0 mole % of an oxide or nitride or a rare earth element.

15. The method of claim 9 wherein the substrate is composed of transparent plastic material.

16. The method of claim 9 wherein the magnetic layer is composed of an amorphous alloy magnetic material.

17. The method of claim 9 wherein the additive is at least one member selected from the group consisting of Al, Ti, Si, Ge, $Al_2O_3$, $Y_2O_3$, $La_2O_3$, $CeO_2$, $Bi_2O_3$, $GeO_2$, $ZrO_2$, CdO, $Cr_2O_3$, $SnO_2$, PbO, AlN, TiN, YN, ZnS, $Sb_2S_3$, $TiSi_2$, and $YSi_2$.

* * * * *